Sept. 8, 1925.
B. REIS
1,553,108
COMBINED COLLAR AND HOOD
Filed Oct. 13, 1922      2 Sheets-Sheet 1
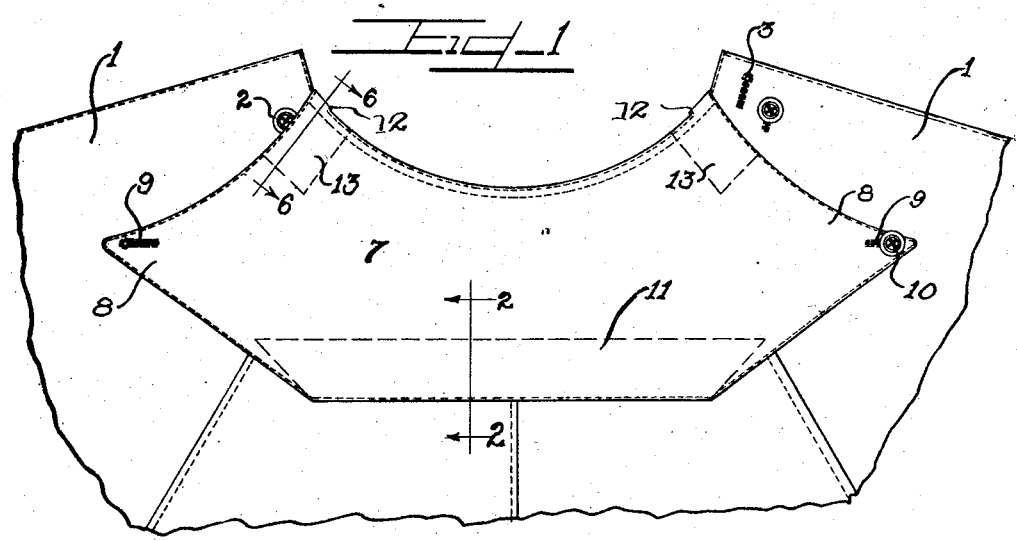
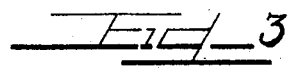
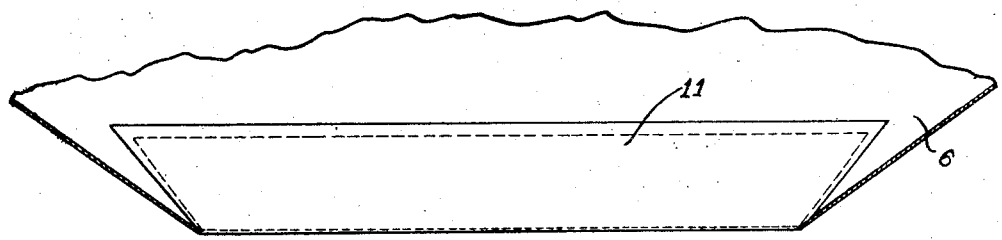
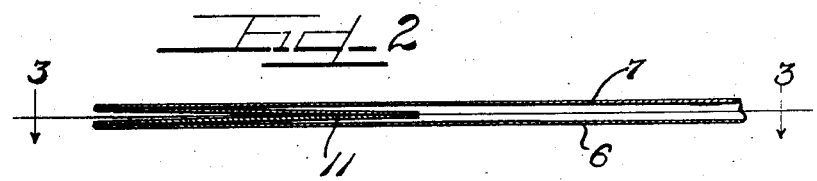

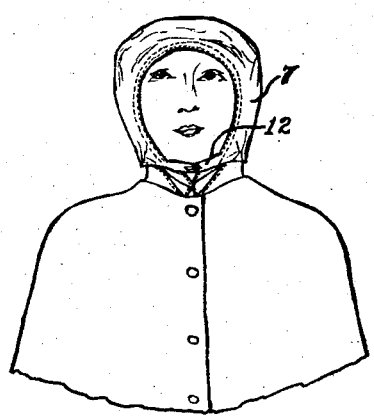
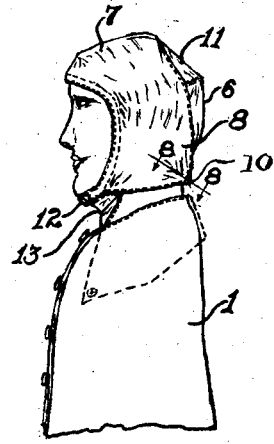
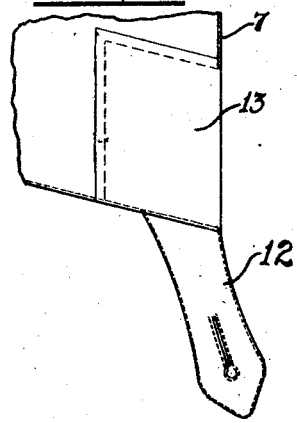
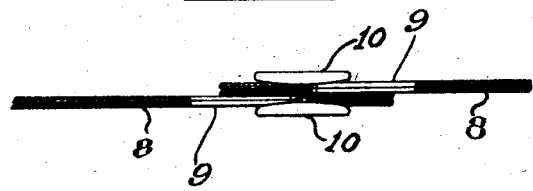

Patented Sept. 8, 1925.

1,553,108

UNITED STATES PATENT OFFICE.

BENEDICT REIS, OF CHICAGO, ILLINOIS, ASSIGNOR TO MINNIE REIS.

COMBINED COLLAR AND HOOD.

Application filed October 13, 1922. Serial No. 594,229.

*To all whom it may concern:*

Be it known that I, BENEDICT REIS, a citizen of the United States, and a resident of the city of Chicago, in the county of Cook and State of Illinois, have invented certain new and useful Improvements in a Combined Collar and Hood; and I do hereby declare that the following is a full, clear, and exact description of the same, reference being had to the accompanying drawings, and to the numerals of reference marked thereon, which form a part of this specification.

This invention relates to a combined collar and hood for raincoats, cloaks, sweaters, and other garments wherein it is desirable to have a convertible collar and hood for inclement weather.

It is an object of this invention to provide a neat appearing convertible collar and hood which, when in use as a collar, completely disguises its other function.

It is a further object of this invention to provide concealed means for extending a collar so that when used as a hood it will completely and comfortably cover the wearer's head.

Other and further important objects of this invention will be apparent from the disclosures in the specification and the accompanying drawings.

The invention (in a preferred form) is illustrated in the drawings and hereinafter more fully described.

On the drawings:

Figure 1 is a plan view of a collar constructed in accordance with this invention, including fragmentary parts of a cloak to which it is attached.

Figure 2 is an enlarged section on the line 2—2 of Figure 1.

Figure 3 is a section on the line 3—3 of Figure 2.

Figure 4 is a front view of a person wearing a cloak embodying the collar of this invention, with the collar arranged as a hood.

Figure 5 is a side view similar to Figure 4 showing the collar position in dotted lines.

Figure 6 is a section on the line 6—6 of Figure 1 the flaps being shown extended.

Figure 7 is a section on the line 7—7 of Figure 6.

Figure 8 is a section on the line 8—8 of Figure 5.

As shown on the drawings:

The numeral 1 refers to a cloak or cape intended to fit snugly around the neck of the wearer. A button 2 and a button hole 3 are provided on the lapels at the corners of the neck opening, and a row of such buttons is shown in Figures 4 and 5 arranged in the usual manner down the front of the garment. It is of course to be understood that any other suitable form of fastening may be substituted for the buttons, as for example snap fasteners, hooks and eyes, buckles and the like.

The collar and hood of this invention comprises a folded or double layer of material cut to conform to the neck of the garment, the inner layer 6 being sewn or otherwise fastened to the neck of the garment and the outer layer 7 free at the neck. Peaked lapels 8 with button holes 9 are formed in the hood and two buttons 10 are sewn together and inserted in either of the button holes. A gusset 11 is provided in the seam of the two layers of fabric opposite the neck opening to provide additional space when the collar is used as a hood.

Flaps or straps 12 are secured to the top layer 7 of the collar at the edges of the neck opening and when in use as a collar these flaps are carried over the edge and down the inside of the garment both to hold the collar closed and to conceal the flaps. Small gussets 13 are provided under each flap between the inner and outer layers of the collar, to fill in the throat opening created when the collar is converted into a hood.

This convertible collar is shown in Figure 1 folded down in a position wherein its other use is not readily apparent, while Figures 4 and 5 show the collar in use as a hood. The hood is formed by lifting the top layer 7 of the collar over the wearer's head, thus extending the gusset 11. The lapel peaks 8 are carried around the back of the head and fastened together. The straps 12 are fastened under the wearer's chin and the gussets 13 open to close the gap between the straps and the neck band of the garment. It is to be noted that this arrangement gives a very neat appearing, snug fitting hood.

The collar may be arranged in a half-way position somewhat like a storm collar by bringing the lapel peaks 8 together in front, producing a double fold of the collar standing up around the neck.

It will be apparent from the foregoing that I have provided a neat appearing collar which may be made in various forms to be suitable for a variety of garments, the provision of the gussets making possible the ready conversion thereof into a comfortable hood.

I am aware that numerous details of construction may be varied through a wide range without departing from the principles of this invention, and I therefore do not purpose limiting the patent granted otherwise than necessitated by the prior art.

I claim as my invention:

1. In combination, a garment, and a convertible collar therefor comprising a folded fabric open on one side and attached at its lower edge to the garment neck, peaked lapels thereon, straps on said fabric adjacent the extremes of said open side, means for fastening said straps under the wearer's chin, and means for fastening said lapels together at the back of the wearer's head.

2. A convertible collar for garments, comprising a folded and sewn fabric open on one side, peaked lapels thereon, straps on said fabric adjacent the extremes of said open side, means for fastening said straps under the wearer's chin, gussets inserted under each strap, and means for fastening said lapels together at the back of the wearer's head.

3. A convertible collar for garments, comprising a folded and sewn fabric open on one side, a gusset in the seam opposite the open side, peaked lapels thereon, straps on said fabric adjacent the extremes of said open side, means for fastening said straps under the wearer's chin, gussets inserted under each strap, and means for fastening said lapels together at the back of the wearer's head.

In testimony whereof I have hereunto subscribed my name.

BENEDICT REIS.